(12) United States Patent
Miller et al.

(10) Patent No.: US 7,298,756 B1
(45) Date of Patent: Nov. 20, 2007

(54) SYSTEM AND METHOD FOR PROGRAMMING CELL PACKET HEADERS

(75) Inventors: Kirk Alvin Miller, San Diego, CA (US); Prayag Bhanubhai Patel, San Diego, CA (US); Peter John Holzer, Fallbrook, CA (US); John Calvin Leung, San Diego, CA (US); George Beshara Bendak, San Diego, CA (US); Jim Lew, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1075 days.

(21) Appl. No.: 10/403,979

(22) Filed: Mar. 31, 2003

Related U.S. Application Data

(63) Continuation-in-part of application No. 10/373,139, filed on Feb. 24, 2003, and a continuation-in-part of application No. 10/035,835, filed on Dec. 24, 2001, now Pat. No. 7,020,131, and a continuation-in-part of application No. 10/029,581, filed on Dec. 20, 2001, and a continuation-in-part of application No. 10/022,673, filed on Dec. 17, 2001, now Pat. No. 7,079,545, and a continuation-in-part of application No. 10/023,266, filed on Dec. 14, 2001, now abandoned.

(51) Int. Cl.
*H04B 7/212* (2006.01)
(52) U.S. Cl. .......... 370/422; 370/466
(58) Field of Classification Search ........ 370/465, 370/466, 473, 474, 389, 413, 419, 429, 421–423
See application file for complete search history.

(56) References Cited

U.S. PATENT DOCUMENTS

| | | | | |
|---|---|---|---|---|
| 5,838,922 A | * | 11/1998 | Galand et al. | 709/232 |
| 5,991,297 A | * | 11/1999 | Palnati et al. | 370/389 |
| 6,621,828 B1 | * | 9/2003 | Field et al. | 370/466 |
| 6,717,956 B1 | * | 4/2004 | Fan et al. | 370/477 |
| 6,781,992 B1 | * | 8/2004 | Rana et al. | 370/394 |
| 7,075,990 B2 | * | 7/2006 | Costa | 375/240.24 |
| 7,079,545 B1 | * | 7/2006 | Yun et al. | 370/412 |
| 2002/0118692 A1 | * | 8/2002 | Oberman et al. | 370/419 |
| 2003/0026206 A1 | * | 2/2003 | Mullendore et al. | 370/230 |
| 2003/0043847 A1 | * | 3/2003 | Haddad | 370/473 |

\* cited by examiner

*Primary Examiner*—Kwang Bin Yao
*Assistant Examiner*—Xiao Qin (Vincent) Lu
(74) *Attorney, Agent, or Firm*—Law Office of Gerald Maliszewski; Gerald Maliszewski

(57) ABSTRACT

A system and method are provided for controlling packet header information in a packet communications switch fabric. The method comprises: programming the cell header overhead (OH) field definitions; accepting a packet including a plurality of cells and corresponding cell headers, each cell header including a plurality of overhead fields; defining the cell header OH fields; and, transmitting the packet. Defining the cell header OH fields includes defining cell header OH field location, position, meaning, structure, and length. In other aspects, the method comprises redefining the cell header overhead fields, once they are accepted. For example, the OH field information can be modified, relocated, or an OH field can be added to the cell header. In yet other aspects, the OH field information can be extracted and/or reformatted.

8 Claims, 23 Drawing Sheets

Fig. 2B

| ADDR. | FIELD LOCATION REGISTER | FIELD DESCRIPTION | WIDTH | DEFAULT |
|---|---|---|---|---|
| 0x51 | SOP_Loc | LOCATION OF START OF PACKET FIELD | 1 | 8 |
| 0x52 | EOP_Loc | LOCATION OF END OF PACKET FIELD | 1 | 9 |
| 0x53 | MC_Loc | LOCATION OF MULTICAST FIELD | 1 | 10 |
| 0x54 | COS_Loc | LOCATION OF CLASS OF SERVICE FIELD | 3 | 11 |
| 0x55 | FID_Loc | LOCATION OF FLOW ID FIELD | 10 | 14 |
| 0x56 | Pack_Len_Loc | LOCATION OF PACKET LENGTH FIELD | 8 | 24 |
| 0x57 | UC_Rdy_Loc | LOCATION OF RDY BIT IN UNICAST CELLS | 1 | 23 |
| 0x58 | MC_Rdy_Loc | LOCATION OF RDY BIT IN MULTICAST CELLS | 1 | 23 |
| 0x59 | UC_Out_Port_Loc | LOCATION OF UNICAST OUTPUT PORT FIELD | 5 | 43 |
| 0x5A | UC_Out_Ch_Loc | LOCATION OF UNICAST OUTPUT CHANNEL FIELD | 2 | 41 |
| 0x5B | UC_Out_Subch_Loc | LOCATION OF UNICAST OUTPUT SUBCHANNEL FIELD | 2 | 39 |
| 0x5C | MC_Out_Port_Loc | LOCATION OF MULTICAST OUTPUT PORT FIELD | 32 | 32 |
| 0x5D | MC_Out_Ch_Loc | LOCATION OF MULTICAST OUTPUT CHANNEL FIELD | 4 | 64 |
| 0x5E | MC_Out_Subch_Loc | LOCATION OF MULTICAST OUTPUT SUBCHANNEL FIELD | 4 | 68 |
| 0x5F | In_Port_Loc | LOCATION OF INPUT PORT FIELD | 32 | 40 |
| 0x60 | In_Ch_Loc | LOCATION OF INPUT CHANNEL FIELD | 4 | 38 |
| 0x61 | In_Subch_Loc | LOCATION OF INPUT SUBCHANNEL FIELD | 4 | 36 |
| 0x62 | UC_FC_Loc | LOCATION OF UNICAST FLOW CONTROL FIELD | 13 | 128 |
| 0x63 | UC_State_Loc | LOCATION OF UNICAST STATE FIELD | 1 | 45 |
| 0x64 | MC_State_Loc | LOCATION OF MULTICAST STATE FIELD | 1 | 49 |
| 0x65 | MC_FC_Loc | LOCATION OF MULTICAST FLOW CONTROL FIELD | 13 | 128 |

Fig. 3

| ADDR. | EG FIELD LOCATION REGISTER | FIELD DESCRIPTION | WIDTH | DEFAULT |
|---|---|---|---|---|
| 0x44 | SOP_Loc | LOCATION OF START OF PACKET FIELD | 1 | 8 |
| 0x45 | EOP_Loc | LOCATION OF END OF PACKET FIELD | 1 | 9 |
| 0x46 | MC_Loc | LOCATION OF MULTICAST FIELD | 1 | 10 |
| 0x47 | COS_Loc | LOCATION OF CLASS OF SERVICE FIELD | 3 | 11 |
| 0x48 | FID_Loc | LOCATION OF FLOW ID FIELD | 10 | 14 |
| 0x49 | Pack_Len_Loc | LOCATION OF PACKET LENGTH FIELD | 8 | 24 |
| 0x4A | FC_Loc | LOCATION OF FLOW CONTROL FIELD | 13 | 128 |
| 0x4B | UC_Out_Port_Loc | LOCATION OF UNICAST OUTPUT PORT FIELD | 5 | 255 |
| 0x4C | UC_Out_Ch_Loc | LOCATION OF UNICAST OUTPUT CHANNEL FIELD | 2 | 255 |
| 0x4D | UC_Out_Subch_Loc | LOCATION OF UNICAST OUTPUT SUBCHANNEL FIELD | 2 | 255 |
| 0x4E | UC_In_Port_Loc | LOCATION OF UNICAST INPUT PORT FIELD | 5 | 255 |
| 0x4F | UC_In_Ch_Loc | LOCATION OF UNICAST INPUT CHANNEL FIELD | 2 | 255 |
| 0x50 | UC_In_Subch_Loc | LOCATION OF UNICAST INPUT SUBCHANNEL FIELD | 2 | 255 |
| 0x51-0x52 | RESERVED | RESERVED | - | - |
| 0x53 | UC_Dat_Loc | LOCATION OF UNICAST START OF PAYLOAD DATA (NOTE: THIS IS NOT ACTUALLY A FIELD) | 2 | 48 |
| 0x54 | MC_Out_Port_Loc | LOCATION OF MULTICAST OUTPUT PORT FIELD | 5 | 255 |
| 0x55 | MC_Out_Ch_Loc | LOCATION OF MULTICAST OUTPUT CHANNEL FIELD | 2 | 255 |
| 0x56 | MC_Out_Subch_Loc | LOCATION OF MULTICAST OUTPUT SUBCHANNEL FIELD | 2 | 255 |
| 0x57 | MC_In_Port_Loc | LOCATION OF MULTICAST INPUT PORT FIELD | 5 | 255 |
| 0x58 | MC_In_Ch_Loc | LOCATION OF MULTICAST INPUT CHANNEL FIELD | 2 | 255 |
| 0x59 | MC_In_Subch_Loc | LOCATION OF MULTICAST INPUT SUBCHANNEL FIELD | 2 | 255 |
| 0x5A | MC_Out_Ch_Msk_Loc | LOCATION OF MULTICAST INPUT CHANNEL FIELD | 4 | 255 |
| 0x5B | MC_In_Subch_Msk_Loc | LOCATION OF MULTICAST INPUT SUBCHANNEL FIELD | 4 | 255 |
| 0x5C | MC_Dat_Loc | LOCATION OF MULTICAST START OF PAYLOAD DATA (NOTE: THIS IS NOT ACTUALLY A FIELD) | - | 48 |
| 0x5D | UC_State_Loc | LOCATION OF UNICAST STATE FIELD | 1 | 255 |
| 0x5E | MC_State_Loc | LOCATION OF MULTICAST STATE FIELD | 1 | 255 |

Fig. 10 INCOMING UNICAST CELL HEADER CONTENTS WITHOUT SUBCHANNELS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE FIRST CELL OF A PACKET |
|   | [1] | EOP (END OF PACKET): ACTIVE HIGH. THIS FIELD INDICATES THAT THE CELL IS THE LAST OF A PACKET. WHEN ASSERTED WITH SOP AND A NON-ZERO LENGTH, IT INDICATES A SINGLE CELL PACKET |
|   | [2] | MC (MULTICAST): INDICATES PACKET IS MULTICAST WHEN '1', AND UNICAST WHEN '0' |
|   | [5:3] | COS[2:0] (CLASS OF SERVICE): INDICATES THE COS OF THE INCOMING PACKET |
|   | [7:6] | FID[9:0]. 10-BIT FLOW IDENTIFIER WHICH INDICATES WHICH FLOW THE PACKET BELONGS TO. BYTE2 [7:0] = FID[9:2], BYTE1 [7:6] = FID[1:0] |
| 2 | [7:0] | |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |
| 4 | [0] | RDY (FLOW CONTROL). USED FOR READY/FULL (XON/XOFF) FLOW CONTROL. XON = '1', XOFF = '0' |
|   | [7:1] | RSVD - RESERVED |
| 5 | [0] | |
|   | [2:1] | OC[1:0] OUTPUT CHANNEL (0-3). INDICATES THE DESTINATION CHANNEL OF THE PACKET |
|   | [7:3] | OP[4:0] OUTPUT PORT (0-31). INDICATES THE DESTINATION PORT OF THE PACKET |
| 6 | [7:0] | (OPTIONAL) QUEUE LEVEL FLOW CONTROL FOR PASSING TO EDFQ/oPQ. THE FIELD CONSISTS OF A 10-BIT QUEUE ID, AND 1-BIT XON/XOFF, FROM BYTE 10 BIT 2 TO BYTE 9 BIT 0 RESPECTIVELY |
| 7 | [2:0] | |
|   | [7:3] | (OPTIONAL) RESERVED |

Fig. 11

INCOMING MULTICAST CELL HEADER CONTENTS, WITHOUT SUBCHANNELS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE FIRST CELL OF A PACKET |
|  | [1] | EOP (END OF PACKET): ACTIVE HIGH. THIS FIELD INDICATES THAT THE CELL IS THE LAST OF A PACKET. WHEN ASSERTED WITH SOP AND A NON-ZERO LENGTH, IT INDICATES A SINGLE CELL PACKET |
|  | [2] | MC (MULTICAST): INDICATES PACKET IS MULTICAST WHEN '1', AND UNICAST WHEN '0' |
|  | [5:3] | COS[2:0] (CLASS OF SERVICE): INDICATES THE COS OF THE INCOMING PACKET |
|  | [7:6] | FID[9:0]. 10-BIT FLOW IDENTIFIER PARAMETER WHICH INDICATES WHICH FLOW THE PACKET BELONGS TO. BYTE2 [7:0] = FID[9:2], BYTE1 [7:6] = FID[1:0] |
| 2 | [7:0] | |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |
| 4 | [7:0] | OP_M[31:0]. OUTPUT PORT MASK. ACTIVE HIGH. PORTS[31:0]. SET ACTIVE THE INTENDED DESTINATIONS. |
| 5 | [7:0] | BYTE7 [7:0] = OP_M[31:24], BYTE6 [7:0] = OP_M[23:16], |
| 6 | [7:0] | BYTE5 [7:0] = OP_M[15:8], BYTE4 [7:0] = OP_M[7:0] |
| 7 | [7:0] | |
| 8 | [3:0] | OC_M[3:0]. OUTPUT CHANNEL MASK, CHANNELS 3:0 RESPECTIVELY. ACTIVE HIGH. IT IS USED FOR CHANNEL MULTICAST. THE INTENDED DESTINATION CHANNELS SHOULD BE SET ACTIVE |
|  | [6:4] | RSVD - RESERVED |
|  | [7] | RDY (FLOW CONTROL). USED FOR READY/FULL (XON/XOFF) FLOW CONTROL. XON = '1', XOFF = '0' |
| 9 | [7:0] | (OPTIONAL) QUEUE LEVEL FLOW CONTROL FOR PASSING TO EDFQ/oPQ. THE FIELD CONSISTS OF A 10-BIT QUEUE ID, AND 1-BIT XON/XOFF, FROM BYTE 10 BIT 2 TO BYTE 9 BIT 0 RESPECTIVELY |
| 10 | [2:0] | |
|  | [7:3] | (OPTIONAL) RESERVED |

Fig. 13  INCOMING UNICAST CELL HEADER CONTENTS WITH SUBCHANNELS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE FIRST CELL OF A PACKET |
|  | [1] | EOP (END OF PACKET): ACTIVE HIGH. THIS FIELD INDICATES THAT THE CELL IS THE LAST OF A PACKET. WHEN ASSERTED WITH SOP AND A NON-ZERO LENGTH, IT INDICATES A SINGLE CELL PACKET |
|  | [2] | MC (MULTICAST): INDICATES PACKET IS MULTICAST WHEN '1', AND UNICAST WHEN '0' |
|  | [5:3] | COS[2:0] (CLASS OF SERVICE): INDICATES THE COS OF THE INCOMING PACKET |
|  | [7:6] | FID[7:0]. 8-BIT FLOW IDENTIFIER WHICH INDICATES WHICH FLOW THE PACKET BELONGS TO. BYTE2 [5:0] = FID[7:2], BYTE1 [7:6] = FID[1:0] |
| 2 | [5:0] |  |
|  | [6] | RSVD - RESERVED |
|  | [7] | RDY (FLOW CONTROL). USED FOR READY/FULL (XON/XOFF) FLOW CONTROL. XON = '1', XOFF = '0' |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |
| 4 | [6:0] | RESERVED |
|  | [7] | OS[1:0] OUTPUT SUBCHANNEL. VALID VALUES ARE 0 TO 3. BYTE5 [0] = OS[1], BYTE4 [7] = OS[0] |
| 5 | [0] |  |
|  | [2:1] | OC[1:0] OUTPUT CHANNEL (0-3). INDICATES THE DESTINATION CHANNEL OF THE PACKET |
|  | [7:3] | OC[4:0] OUTPUT PORT (0-31). INDICATES THE DESTINATION PORT OF THE PACKET |
| 6 | [7:0] | (OPTIONAL) QUEUE LEVEL FLOW CONTROL FOR PASSING TO EDFQ/oPQ. THE FIELD CONSISTS OF A 10-BIT QUEUE ID, AND 1-BIT XON/XOFF, FROM BYTE 10 BIT 2 TO BYTE 9 BIT 0 RESPECTIVELY |
| 7 | [2:0] |  |
|  | [7:3] | (OPTIONAL) RESERVED |

Fig. 14A
INCOMING MULTICAST CELL HEADER CONTENTS, WITH SUBCHANNELS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE FIRST CELL OF A PACKET. |
| | [1] | EOP (END OF PACKET): ACTIVE HIGH. THIS FIELD INDICATES THAT THE CELL IS THE LAST OF A PACKET. WHEN ASSERTED WITH SOP AND A NON-ZERO LENGTH, IT INDICATES A SINGLE CELL PACKET |
| | [2] | MC (MULTICAST): INDICATES PACKET IS MULTICAST WHEN '1', AND UNICAST WHEN '0' |
| | [5:3] | COS[2:0] (CLASS OF SERVICE): INDICATES THE COS OF THE INCOMING PACKET |
| | [7:6] | FID[7:0]. 8-BIT FLOW IDENTIFIER, WHICH INDICATES WHICH FLOW THE PACKET BELONGS TO. BYTE2 [5:0] = FID[7:2], BYTE1 [7:6] = FID[1:0] |
| 2 | [5:0] | |
| | [6] | RSVD - RESERVED |
| | [7] | RDY (FLOW CONTROL), USED FOR READY/FULL (XON/XOFF) FLOW CONTROL. XON = '1', XOFF = '0' |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |

Fig. 14B

| | | |
|---|---|---|
| 4 | [7:0] | OP_M[31:0].OUTPUT PORT MASK. ACTIVE HIGH. PORTS[31:0]. SET ACTIVE THE INTENDED DESTINATIONS. |
| 5 | [7:0] | |
| 6 | [7:0] | BYTE7 [7:0] = OP_M[31:24], BYTE6 [7:0] = OP_M[23:16], BYTE5 [7:0] = OP_M[15:8], BYTE4 [7:0] = OP_M[7:0] |
| 7 | [7:0] | |
| 8 | [3:0] | OC_M[3:0]. OUTPUT CHANNEL MASK, CHANNELS 3:0 RESPECTIVELY. ACTIVE HIGH. IT IS USED FOR CHANNEL MULTICAST. THE INTENDED DESTINATION CHANNELS SHOULD BE SET ACTIVE |
| | [7:4] | OC_M[3:0]. OUTPUT SUBCHANNEL MASK, SUBCHANNELS 3:0 RESPECTIVELY. ACTIVE HIGH. IT IS USED FOR SUBCHANNEL MULTICAST. THE INTENDED DESTINATION SUBCHANNELS SHOULD BE SET ACTIVE |
| 9 | [7:0] | (OPTIONAL) QUEUE LEVEL FLOW CONTROL FOR PASSING TO EDFQ/oPQ. THE FIELD CONSISTS OF A 10-BIT QUEUE ID, AND 1-BIT XON/XOFF, FROM BYTE 10 BIT 2 TO BYTE 9 BIT 0 RESPECTIVELY |
| 10 | [2:0] | |
| | [7:3] | (OPTIONAL) RESERVED |

Fig. 18 CYCLONE FLOW CONTROL FIELD FORMAT FC[15:0]

| BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | RESERVED | | | | RDY | VALID | Credit_ID [9:0] | | | | | | | | | |

Fig. 16

OUTGOING CELL HEADER CONTENTS, WITHOUT SUBCHANNELS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE FIRST CELL OF A PACKET |
|  | [1] | EOP (END OF PACKET): ACTIVE HIGH. THIS FIELD INDICATES THAT THE CELL IS THE LAST OF A PACKET. WHEN ASSERTED WITH SOP AND A NON-ZERO LENGTH, IT INDICATES A SINGLE CELL PACKET |
|  | [2] | MC (MULTICAST): INDICATES PACKET IS MULTICAST WHEN '1', AND UNICAST WHEN '0' |
|  | [5:3] | COS[2:0] (CLASS OF SERVICE): INDICATES THE COS OF THE PACKET |
|  | [7:6] | FID[9:0]. 10-BIT FLOW IDENTIFIER WHICH INDICATES WHICH FLOW THE PACKET BELONGS TO. |
| 2 | [7:0] | BYTE2 [7:0] = FID[9:2], BYTE1 [7:6] = FID[1:0] |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |
| 4 | [7:0] | FC[15:0]: FLOW CONTROL. |
| 5 | [7:0] | BYTE5 [7:0] = FC[15:8], BYTE4 [7:0] = FC[7:0] |
| 6 | [7:0] | RESERVED (WHEN IN MULTICAST FORMAT) |
| 7 | [7:0] |  |
| 8 | [7:0] |  |
| 9 | [7:0] |  |
| 10 | [7:0] | (OPTIONAL) RESERVED (WHEN IN MULTICAST FORMAT WITH QUEUE LEVEL FLOW CONTROL) |

Fig. 17

OUTGOING CELL HEADER CONTENTS, WITH SUBCHANNELS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE START OF A PACKET |
|   | [1] | EOP (END OF PACKET): ACTIVE HIGH. THIS FIELD INDICATES THAT THE CELL IS THE END OF A PACKET. WHEN ASSERTED WITH SOP, IT INDICATES A SINGLE CELL PACKET |
|   | [2] | MC (MULTICAST): INDICATES PACKET IS MULTICAST WHEN '1', AND UNICAST WHEN '0' |
|   | [5:3] | COS[2:0] (CLASS OF SERVICE): INDICATES THE COS OF THE PACKET |
|   | [7:6] | FID[7:0]. 8-BIT FLOW IDENTIFIER WHICH INDICATES WHICH FLOW THE PACKET BELONGS TO. BYTE2 [5:0] = FID[7:2], BYTE1 [7:6] = FID[1:0] |
| 2 | [5:0] |  |
|   | [7:6] | RSVD - RESERVED |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |
| 4 | [7:0] | FC[15:0]: FLOW CONTROL |
| 5 | [7:0] | BYTE5 [7:0] = FC[15:8], BYTE4 [7:0] = FC[7:0] |
| 6 | [7:0] | RSVD - RESERVED (WHEN IN MULTICAST FORMAT) |
| 7 | [7:0] |  |
| 8 | [7:0] |  |
| 9 | [7:0] |  |
| 10 | [7:0] | (OPTIONAL) RESERVED (WHEN IN MULTICAST FORMAT WITH QUEUE LEVEL FLOW CONTROL) |

Fig. 21

BACKPLANE UNICAST CELL HEADER CONTENTS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE FIRST CELL OF A PACKET |
|  | [1] | EOP (END OF PACKET): ACTIVE HIGH. THIS FIELD INDICATES THAT THE CELL IS THE LAST OF A PACKET. WHEN ASSERTED WITH SOP AND A NON-ZERO LENGTH, IT INDICATES A SINGLE CELL PACKET |
|  | [2] | MC (MULTICAST): INDICATES PACKET IS MULTICAST WHEN '1', AND UNICAST WHEN '0' |
|  | [5:3] | COS[2:0] (CLASS OF SERVICE): INDICATES THE COS OF THE PACKET |
|  | [7:6] | FID[9:0]. 10-BIT FLOW IDENTIFIER WHICH INDICATES WHICH FLOW THE PACKET BELONGS TO. |
| 2 | [7:0] | BYTE2 [7:0] = FID[9:2], BYTE1 [7:6] = FID[1:0] |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |
| 4 | [1:0] | OS[1:0] OUTPUT SUBCHANNEL (0-3). INDICATES DESTINATION SUBCHANNEL |
|  | [3:2] | OC[1:0] OUTPUT CHANNEL (0-3). INDICATES DESTINATION CHANNEL |
|  | [5:4] | IS[1:0] INPUT SUBCHANNEL (0-3). INDICATES SOURCE SUBCHANNEL OF THE PACKET |
|  | [7:6] | IC[1:0] INPUT CHANNEL (0-3). INDICATES SOURCE CHANNEL OF THE PACKET |
| 5 | [4:0] | IP[4:0] INPUT PORT (0-31). INDICATES SOURCE PORT OF THE PACKET |
|  | [5] | STATE BIT USED TO RESYNCHRONIZE BACKPLANE FLOW CONTROL CREDITS |
|  | [7:6] | RESERVED |

Fig. 22 BACKPLANE MULTICAST CELL HEADER CONTENTS

| BYTE | BIT | DESCRIPTION |
|---|---|---|
| 0 | [7:0] | SYNCHRONIZATION CHARACTER (K28.5 / 0xBC) |
| 1 | [0] | SOP (START OF PACKET): ACTIVE HIGH. THIS FIELD INDICATES THAT THE CELL IS THE FIRST CELL OF A PACKET |
|  | [1] | EOP (END OF PACKET): ACTIVE HIGH. THIS FIELD INDICATES THAT THE CELL IS THE LAST OF A PACKET. WHEN ASSERTED WITH SOP AND A NON-ZERO LENGTH, IT INDICATES A SINGLE CELL PACKET |
|  | [2] | MC (MULTICAST): INDICATES PACKET IS MULTICAST WHEN '1', AND UNICAST WHEN '0' |
|  | [5:3] | COS[2:0] (CLASS OF SERVICE): INDICATES THE COS OF THE PACKET |
|  | [7:6] | FID[9:0]. 10-BIT FLOW IDENTIFIER PARAMETER, WHICH INDICATES WHICH FLOW THE PACKET BELONGS TO. BYTE2 [7:0] = FID[9:2], BYTE1 [7:6] = FID[1:0] |
| 2 | [7:0] |  |
| 3 | [7:0] | LEN[7:0] PACKET LENGTH. WHEN SOP IS SET IT INDICATES THE NUMBER OF CELLS IN THE PACKET, ALL OTHER TIMES IT INDICATES THE NUMBER OF BYTES IN A CELL USED FOR PAYLOAD. MAXIMUM PACKET LENGTH IS 192 CELLS |
| 4 | [3:0] | OC_M[3:0]. OUTPUT CHANNEL MASK, CHANNELS 3:0 RESPECTIVELY. ACTIVE HIGH |
|  | [5:4] | IS[1:0] INPUT SUBCHANNEL (0-3). INDICATES THE INPUT SUBCHANNEL THE PACKET CAME FROM |
|  | [7:6] | IC[1:0] INPUT CHANNEL (0-3). INDICATES THE INPUT CHANNEL THE PACKET CAME FROM |
| 5 | [4:0] | IP[4:0] INPUT PORT (0-31). INDICATES THE INPUT PORT THE PACKET CAME FROM |
|  | [7:5] | OS_M[3:0]. OUTPUT SUBCHANNEL MASK, SUBCHANNELS 3:0 RESPECTIVELY. ACTIVE HIGH. IT IS USED FOR SUBCHANNEL MULTICAST. THE INTENDED DESTINATION SUBCHANNELS SHOULD BE SET ACTIVE. |
| 6 | [0] |  |
|  | [1] | STATE BIT USED TO RESYNCHRONIZE BACKPLANE FLOW CONTROL CREDITS |
|  | [7:2] | RESERVED |
| 7 | [7:0] | RESERVED |
| 8 | [7:0] | RESERVED |

SYSTEM AND METHOD FOR PROGRAMMING CELL PACKET HEADERS

RELATED APPLICATIONS

This application is a continuation-in-part of a pending application entitled, SYSTEM AND METHOD FOR SWITCHING VARIABLY SIZED INFORMATION GROUPS, invented by Yun et al., Ser. No. 10/023,266, filed Dec. 14, 2001 now abandoned.

This application is a continuation-in-part of a pending application entitled, SYSTEM AND METHOD FOR SIMULTANEOUS DEFICIT ROUND ROBIN PRIORITIZATION, invented by Yun et al., Ser. No. 10/022,673, filed Dec. 17, 2001 now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of a pending application entitled, SYSTEM AND METHOD FOR HIERARCHIAL SWITCHING, invented by Yun et al., Ser. No. 10/035,835, filed Dec. 24, 2001 now U.S. Pat. No. 7,020,131.

This application is a continuation-in-part of a pending application entitled, SYSTEM AND METHOD FOR TOLERATING DATA LINK FAULTS IN A PACKET COMMUNICATIONS SWITCH FABRIC, invented by Clovis et al., Ser. No. 10/373,139, filed Feb. 24, 2003, which is incorporated herein by reference.

BACKGROUND OF THE INVENTION

1. Field of the Invention

This invention generally relates to packet communications switching and, more particularly, to a system and method for programming and redefining information in a packet cell header in passage through a switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 24 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link Per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only high compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric cell header structure could be programmed and defined with respect to interfacing traffic managers.

SUMMARY OF THE INVENTION

The present invention describes a switch fabric with programmable cell header information. This programmability permits the switch fabric to be adapted to the characteristics of the interfacing networks. The flexibility in definition, and redefinition, of the overhead information permits the cell header to be used in switch fabric and network control communications.

Accordingly, a method is provided for controlling packet header information in a packet communications switch fabric. The method comprises: programming the cell header overhead (OH) field definitions; accepting a packet including a plurality of cells and corresponding cell headers, each cell header including a plurality of overhead fields; defining the cell header OH fields; and, transmitting the packet. Defining the cell header OH fields includes defining cell header OH field location, position, meaning, structure, and length.

In other aspects, the method comprises redefining the cell header overhead fields, once they are accepted. For example, the OH field information can be modified, relocated, or an OH field can be added to the cell header. In yet other aspects, the OH field information can be extracted and/or reformatted.

A system is also provided for controlling packet header information in a packet communications switch fabric. The system comprises a port card having an input interface to accept a packet including a plurality of cells and corresponding cell headers, where each cell header including a plurality of overhead fields. The port card defines the cell header OH fields and transmits the packet from an output interface. As mentioned above, the cell header OH fields are defined to interface the switch fabric to a network, typically a network of traffic managers.

More specifically, the port card can either be an input port card (IPC) having ingress ports to accept packets and ingress backplane data links to transmit packets, or an output port card (OPC) having egress backplane data links to accept packets and egress ports to transmit packets.

Additional details of the above-described system and method are provided below.

BRIEF DESCRIPTION OF THE DRAWINGS

FIG. 3 is a diagram illustrating exemplary configurations of Egress Cell Headers.

FIG. 10 is a table illustrating an exemplary configuration of the Incoming Unicast Cell Header Contents without Subchannels.

FIG. 11 is a table illustrating an exemplary configuration of the Incoming Multicast Cell Header Contents without Subchannels.

FIG. 13 is a table illustrating an exemplary configuration of the Incoming Unicast Cell Header Contents with Subchannels.

FIG. 14 is a table illustrating an exemplary configuration of the Incoming Multicast Cell Header Contents with Subchannels.

FIG. 16 is a table illustrating an exemplary configuration of the Outgoing Cell Header Contents, without Subchannels.

FIG. 17 is a table illustrating an exemplary configuration of the Outgoing Cell Header Contents, with Subchannels.

FIG. 18 depicts an exemplary configuration of the Cyclone Flow Control Field Format FC[15:0].

FIG. 21 is a table illustrating an exemplary configuration of the Backplane Unicast Cell Header Contents.

FIG. 22 is a table illustrating an exemplary configuration of the Backplane Multicast Cell Header Contents.

DETAILED DESCRIPTION OF THE PREFERRED EMBODIMENTS

Figure 1:
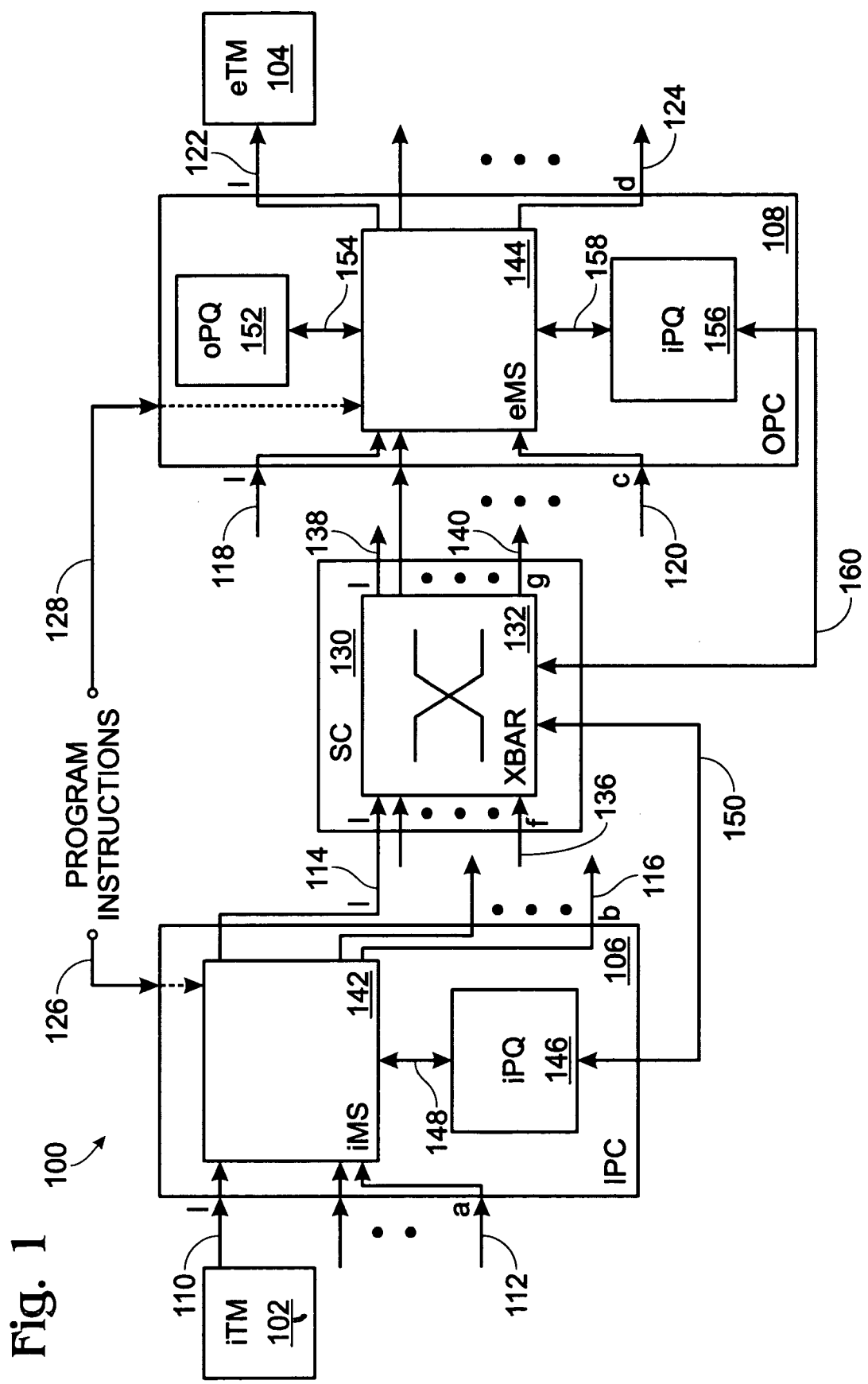
FIG. 1 is a schematic block diagram of the present invention system for controlling packet header information in a packet communications switch fabric.

FIG. 1 is a schematic block diagram of the present invention system for controlling packet header information in a packet communications switch fabric. At the most fundamental level, the system 100 comprises a port card having an input interface to accept a packet including a plurality of cells and corresponding cell headers, where each cell header including a plurality of overhead fields. The port card defines the cell header overhead (OH) fields and transmits the packet from an output interface. The port card chiefly defines the cell header OH fields so that it can communicate with an interfacing ingress traffic manager 102 (iTM) and/or egress TM 104 (eTM). As explained in more detail below, the port card defines cell header OH field location, position, meaning, structure, and/or length.

More specifically, the port card can either be an input port card 106 (IPC) or an output port card 108 (OPC). The IPC 106 has ingress ports 1 through a on lines 110 through 112 to accept packets. The IPC 106 transmits packets on ingress backplane data links 1 through b on lines 114 through 116. The OPC 108 accepts packets on egress backplane data links 1 through c on lines 118 through 120 and uses egress ports 1 through d on lines 122 through 124 to transmit packets. The values of a, b, c, and d are not limited to any particular value.

The port cards 106/108 have inputs on lines 126 and 128, respectively, to accept programming instructions for defining cell header OH field. Further, either the IPC 106 and/or the OPC may act to redefine the cell header OH fields. For example, either port card 106/108 may redefine the cell header overhead fields by: modifying OH field information; relocating OH fields in the cell header; and/or adding OH fields to the cell header. Further, either port card 106/108 may extract OH field information from the cell header, or reformat the OH fields in the cell header.

The system 100 further comprises a switch card (SC) 130 with a crossbar 132 having crossbar inputs 1 through f on lines 114 through 136 that are selectively connectable to crossbar outputs 1 through g on lines 138 through 140. The values of f and g are not limited to any particular value. The crossbar 132 (Xbar) transfers packets between the IPC and the OPC. The IPC 106 has ingress backplane data links connected to the crossbar inputs. Likewise, the OPC 108 has egress backplane data links connected to the crossbar outputs. Typically, the system would include a plurality of IPCs, OPCs, and crossbars (not shown). A single crossbar might be connected to a number, or perhaps all of the IPCs and OPCs. Likewise, a single IPC (or OPC) may be connected to a number of crossbars. In other aspects, each port card performs IPC and OPC functions.

The IPC 106 includes an ingress memory subsystem 142 (iMS) having inputs connected to the ingress ports 1 through a for buffering the accepted packets. The iMS 142 has outputs for transmitting buffered packets on the egress backplane data links 1 through b. The IPC 106 may redefine the cell header OH fields buffered in the iMS. The IPC 106 can also be said to define the cell header OH fields that are buffered in the iMS 142, in the sense that IPC communicates and/or operates on the packets using the OH programmed definitions.

Likewise, the OPC 108 includes an egress MS 144 (eMS) having inputs connected to the egress backplane data links 1 through c for buffering accepted packets from the crossbar 132. The eMS 144 has outputs for transmitting the buffered packets on the OPC egress ports 1 through d. The OPC 108 redefines (and/or defines) the cell header OH fields buffered in the eMS.

Typically, the IPC 106 includes an ingress priority queue 146 (iPQ), or other type of scheduling/queuing device, connected to the iMS 142 on line 148, and the crossbar 132 on line 150 for managing the backplane data links. The OPC 108 includes an egress PQ 152 (oPQ) connected to the eMS 144 on line 154 for managing the OPC egress ports. The OPC 108 may also include an iPQ 156, or other scheduling device, connected to the eMS 144 on line 158 for relaying backplane control information to the IPC iPQ 146 on line 160, through the crossbar 132.

The IPC iMS 142 may redefine cell header OH fields by extracting and accepting information from a cell header OH field. For example, the information can be extracted as a function of control communications. The iMS 142 may exchange the information in one OH field from the cell header with information from another OH field. The iMS 142 may also move the position of an OH field in the cell header. In one aspect, the iMS 142 reformats the OH field structure. For example, the iMS 142 may change to formatting from one that is suitable for unicasting (transmitting to a single destination), to one suitable for multicasting. The iMS 142 may add an OH field to the cell header and populate the added OH field with information. In other aspects, the iMS 142 replaces information in an OH field with alternate information. In at least one aspect, the iMS 142 defines a field that is embedded in another field.

Likewise, the OPC eMS 144 redefines the cell header OH fields by extracting information from an OH field and sending the information to the OPC iPQ 156. For example, credit information used in the management of the backplane data links can be extracted and relayed through the iPQ 156. The eMS 144 can extract information from an OH field and sending the information to the OPC oPQ 152. Further, the eMS 144 can redefine cell header OH fields by: exchanging the information in one OH field with information from another OH field; moving the position of an OH field in the cell header; reformatting the OH field structure; adding an OH field to the cell header and populating the added OH field with information; replacing information in an OH field with alternate information; and, extracting information from a field embedded in another field.

In one aspect, the IPC iMS 142 embeds a field of secondary class of service (COS) information inside another field. The OPC eMS 144 extracts the secondary COS information and transmits the packet in response to the secondary COS information. In another aspect, IPC iMS 142 embeds dummy port information in the OH fields associated with unused (unconnected) OPC egress ports. The OPC eMS 144 extracts the dummy port information and transfers the information to the iPQ 156. The OPC iPQ 156 sends the dummy port information to the IPC iPQ 146, and iPQ 146 uses the dummy port information in the management of the backplane data links.

FUNCTIONAL DESCRIPTION

Figure 2A:
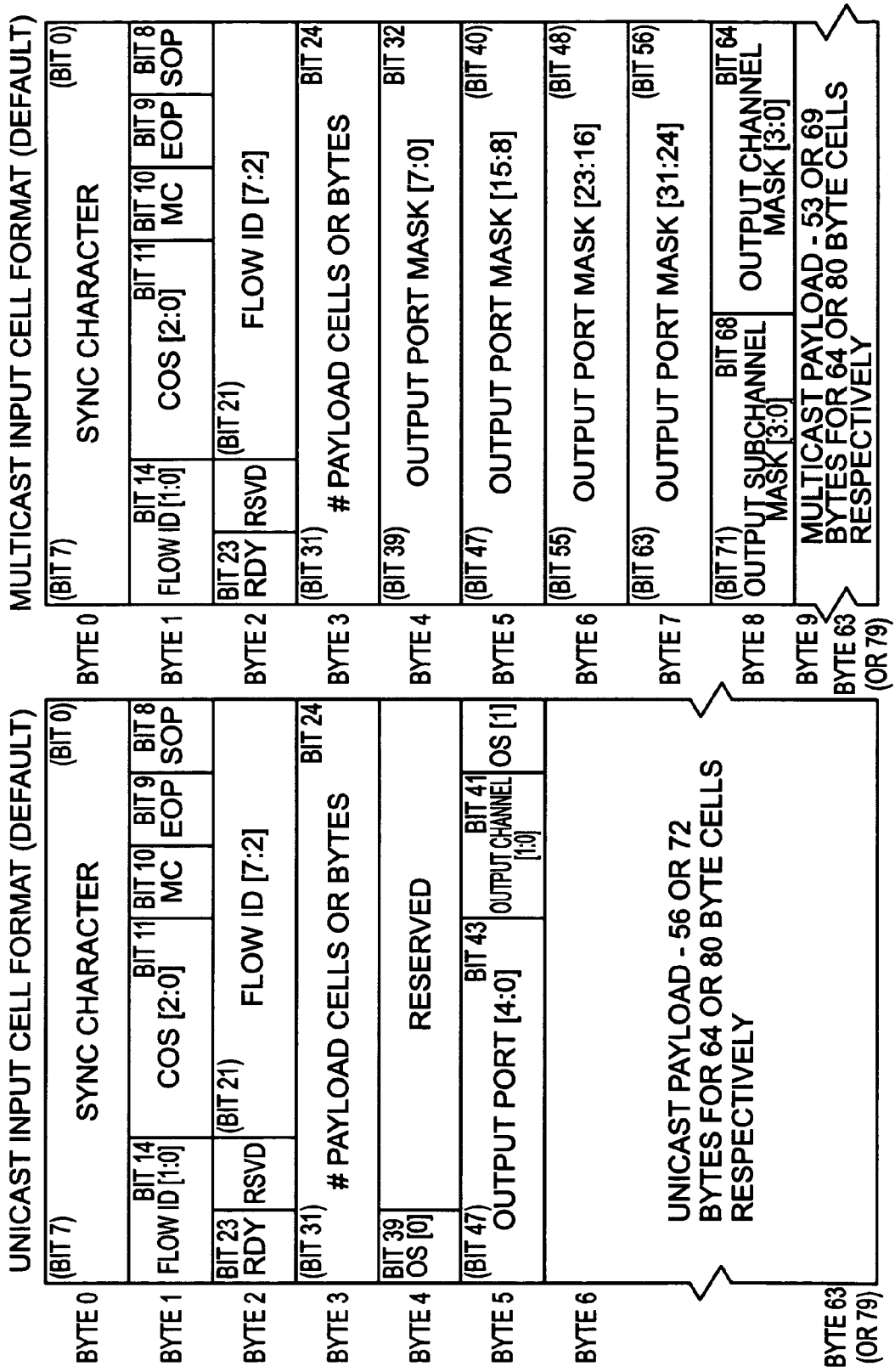
FIG. 2 is a diagram illustrating exemplary configurations of Ingress Cell Headers.

FIG. 2 is a diagram illustrating exemplary configurations of Ingress Cell Headers.

FIG. 3 is a diagram illustrating exemplary configurations of Egress Cell Headers.

The below information is stored for each cell in the cell buffer of the iMS. An asterisk indicates that the MS derives the field, based upon the ingress subchannel/channel.

SOP—start of packet
EOP—end of packet
COS[2:0]—class of service
Flow_id[9:0]
Length[7:0]—packet length
os[1:0]—output subchannel
oc[1:0]—output channel
is[1:0]—input subchannel*
ic[1:0]—input channel*
ip[4:0]—input port*
op[4:0]—output port
credit state—credit state (for TM credits, not BP credits)
op_m[31:0]—output port mask
os_m[3:0]—output subchannel mask
oc_m[3:0]—output channel mask
Payload—bytes of cell payload.

The present invention is exemplified, in one embodiment, as the S8005 Cyclone chip set series; a high-capacity switching fabric that seamlessly handles both packet and TDM (Time Division Multiplexed) traffic. The switch fabric can process all types of packet traffic (ATM, MPLS, IP, etc.) equally well. The AMCC Cyclone switch fabric is based on a set of four highly integrated ICs which contain SERDES and memory in order to reduce the overall system power, routing complexity, and required board area. The chip set consists of the following chips:

S8505 Priority Queue (PQ)
S8605 Arbiter/Crossbar
S8805 Earliest Deadline First Queue (EDFQ)
S8905 Memory Subsystem (MS).

Traffic management is integrated into the switch fabric and occurs at the ingress, switching and egress in order to guarantee Quality of Service (QoS). The switch fabric is scalable and can terminate up to 128 OC-192's (1.28 Tbps). It can be organized as a 32×32 port switch where each port consists of four OC-192 channels, in effect implementing a 128×128 switch. The OC-192's can be either channelized or concatenated. The fabric can also be thoughT of as a 512×512 switch since each channel an be treated as four OC-48 subchannels. In addition to the port cards, there are up to sixteen switching cards (depending on the chosen architecture and organization), which consist of Arbiters and Crossbars. Each switching card has connectionS to all the port cards.

Figure 4:
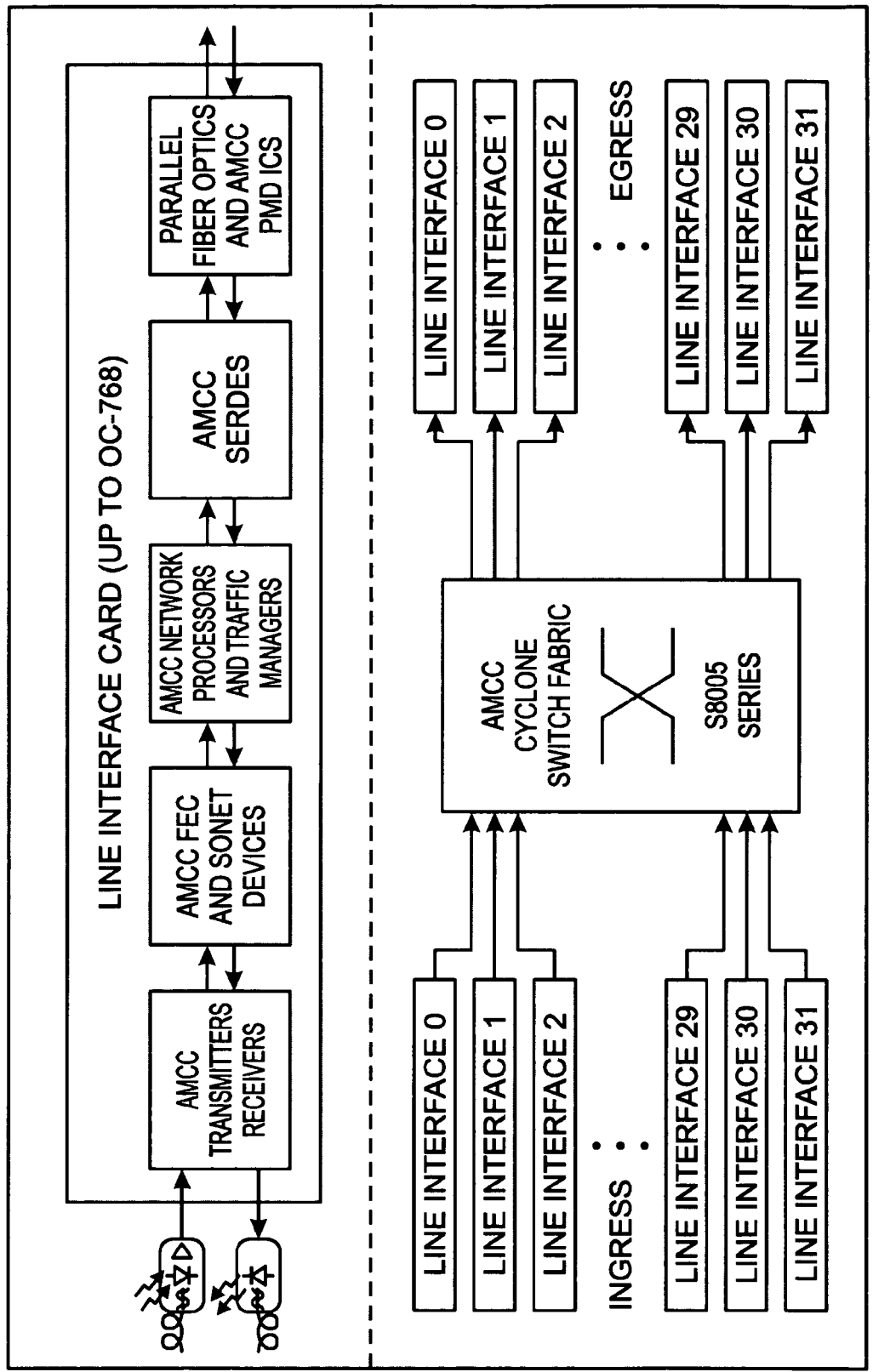
FIG. 4 is a diagram depicting the Cyclone switch fabric system.

FIG. 4 is a diagram depicting the Cyclone switch fabric system. The interface into and out of the switch fabric passes cells over 2.5 Gbps serial links, which include 8B/10B encoding. Each channel of the switch fabric consists of up to ten serial links, providing up to 20 Gbps data rate throughput. This the following logical cell formats can be used:

Cyclone (64 or 80 byte cells)
ViX-v3 OC-48
ViX-v3 OC-192

Link Allocation

Figure 5:
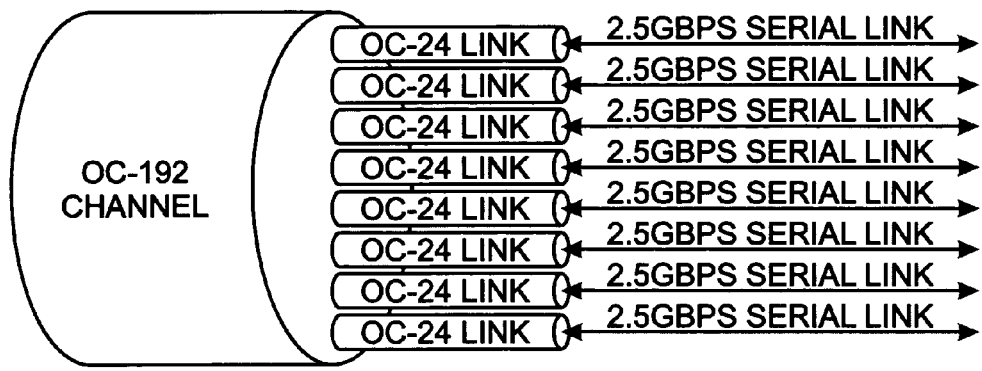
FIG. 5 depicts the Channel Interface using eight OC-24 links.

FIG. 5 depicts the Channel Interface using eight OC-24 links. All data sent to or from the Cyclone switch fabric must be in a cellularized format. The Cyclone fabric supports a number of different cell formats. The number of links used to transfer the cells depends on the cell format selected. The three primary cell formats are Cyclone native, ViX-v3 OC-48, and ViX-v3 OC-192. Any given cell must be carried on 1, 2 or 8 links depending on which of the three primary cell formats is used. Desired cell format(s) are selected upon initialization. Each MS supports up to four OC-192 input channels and four OC-192 output channels, with each channel containing up to 10 links. Each channel can also be set to support a different cell format. Cell format cannot be changed without shutting down the traffic on the affected channel.

Figure 6:
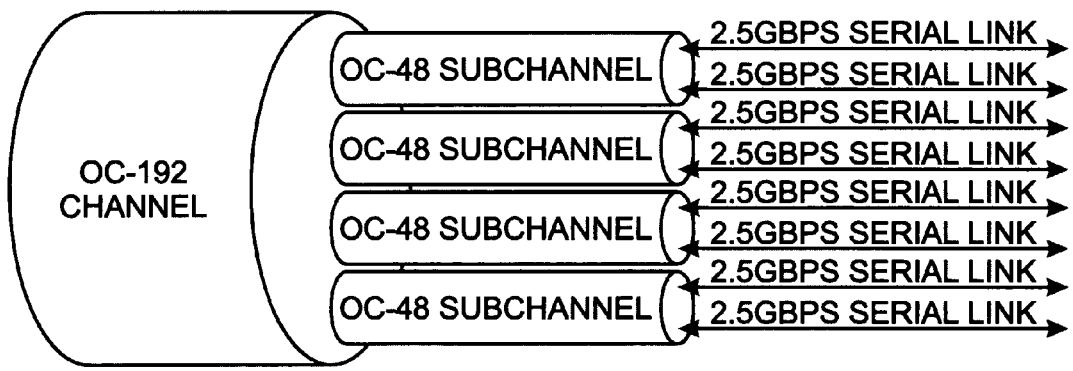
FIG. 6 is a diagram illustrating the Channel Interface using four OC-48 Subchannels.

FIG. 6 is a diagram illustrating the Channel Interface using four OC-48 Subchannels. The Cyclone native cell format uses a one physical link for cell and packet transfer. This link is referred to as an OC-24 link, with cell overhead and 8B/10B encoding implied.

Figure 7:
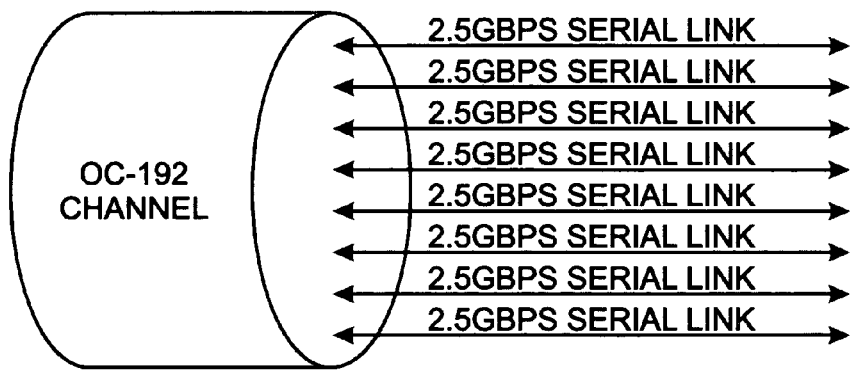
FIG. 7 depicts the Channel Interface using an OC-192 Channel.

FIG. 7 depicts the Channel Interface using an OC-192 Channel. The ViX-v3 OC-48 cell format stripes across two physical links for cell and packet transfer.

Figure 8:
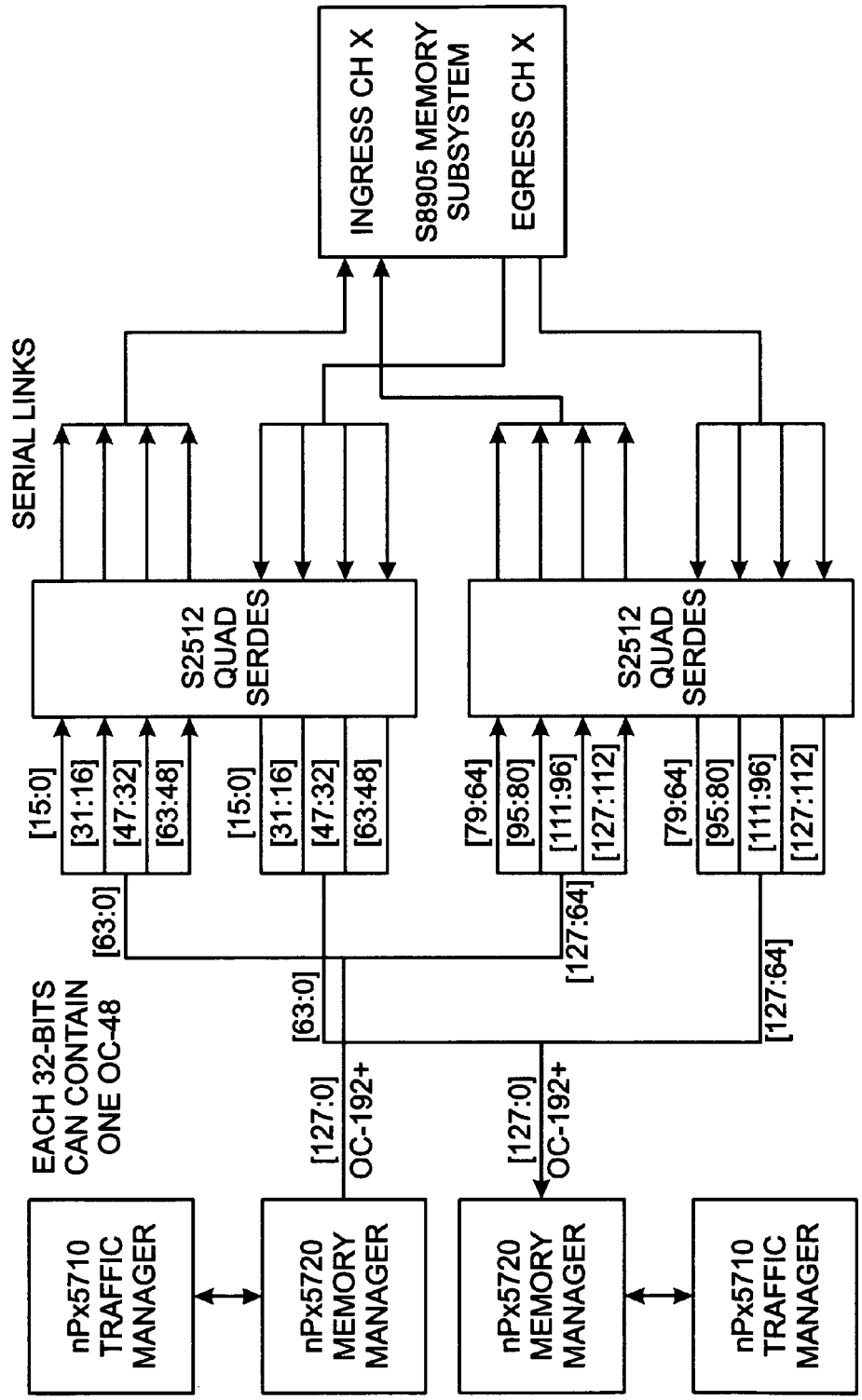
FIG. 8 depicts ViX-v3 Interface Bus Connectivity.

FIG. 8 depicts ViX-v3 Interface Bus Connectivity. The ViX-v3 OC-192 cell format stripes across eight physical links for cell and packet transfer.

Cyclone Cell Format

In Cyclone mode, each cell arrives on only one serial link. The cell size can be either 64 or 80 bytes which is programmable, but must be uniform throughout the fabric. The first byte in the cell is the synchronization character which is used for synchronizing and determining the beginning of each cell.

Cyclone Input Cell Format, without Subchannels

Figure 9:
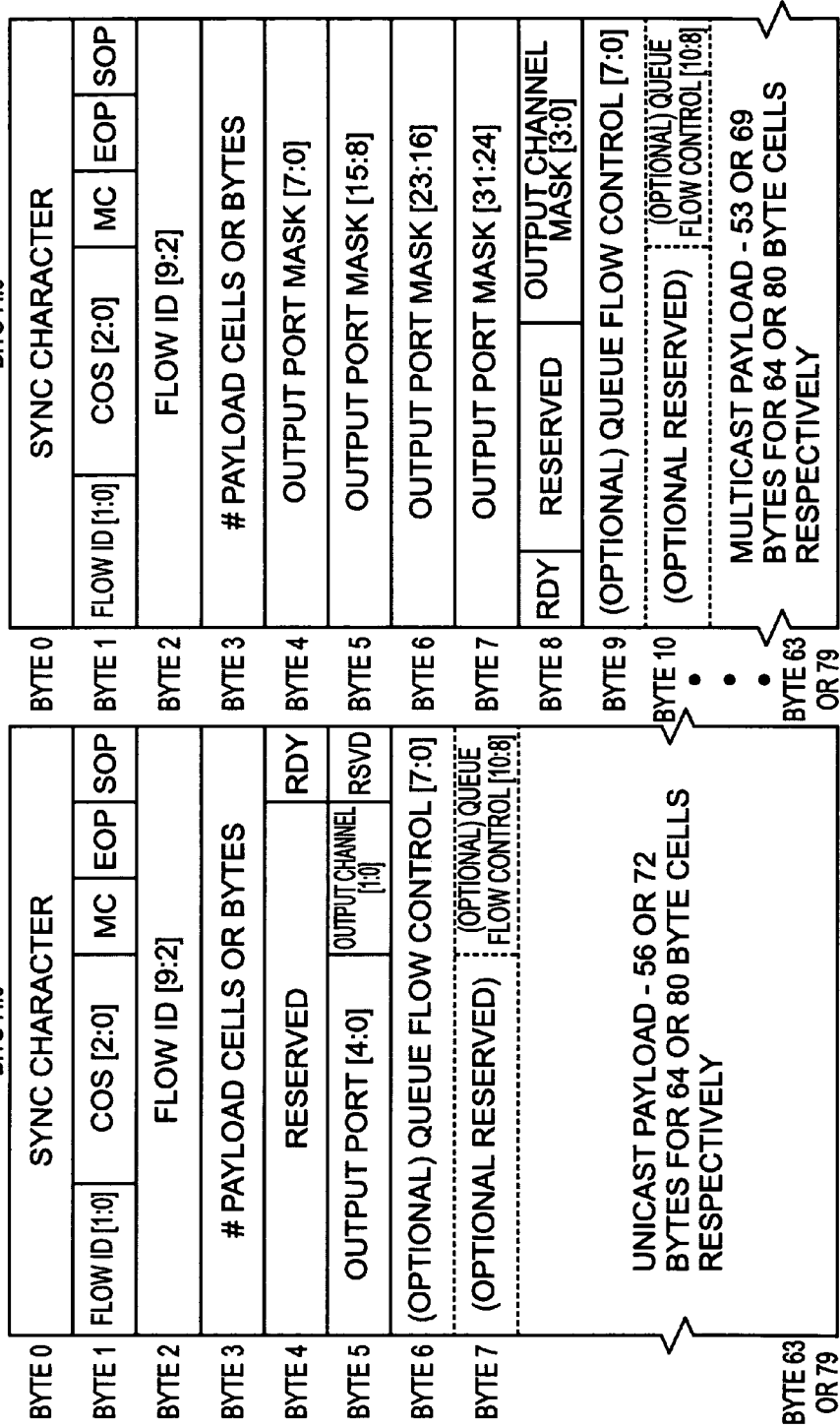
FIG. 9 illustrates an exemplary configuration of the Cyclone Input Cell Format, without Subchannels.

FIG. 9 illustrates an exemplary configuration of the Cyclone Input Cell Format, without Subchannels. As can be seen from the figure, a unicast cell has six bytes of header information and a multicast cell has nine bytes. Two additional overhead bytes are available to configure as a queue level flow control field. A unicast cell can contain a data payload of either 56 or 72 bytes for a 64-byte or 80-byte cell respectively. A multicast cell contains a data payload of either 53 or 69 bytes for a 64-byte or 80-byte cell respectively. These numbers assume the two optional queue level flow control bytes are in use; if not, the payload space available is increased by two bytes.

FIG. 10 is a table illustrating an exemplary configuration of the Incoming Unicast Cell Header Contents without Subchannels. Note that the example cell formats FIG. 9 and FIG. 10 assume a system with 32 port cards. In a smaller switch fabric with 8 port cards, the output port mask in FIG. 9 could be reduced from 32 bits to 8 bits, thereby adding 3 bytes per cell to the payload for multicast cells, improving efficiency of the system. For the unicast cells, the 5-bit Output Port field could be reduced from 5 bits to 3 bits, allowing other user-defined flags to be placed in theses spare bits.

FIG. 11 is a table illustrating an exemplary configuration of the Incoming Multicast Cell Header Contents without Subchannels.

Cyclone Input Cell Format with Subchannels

Figure 12:
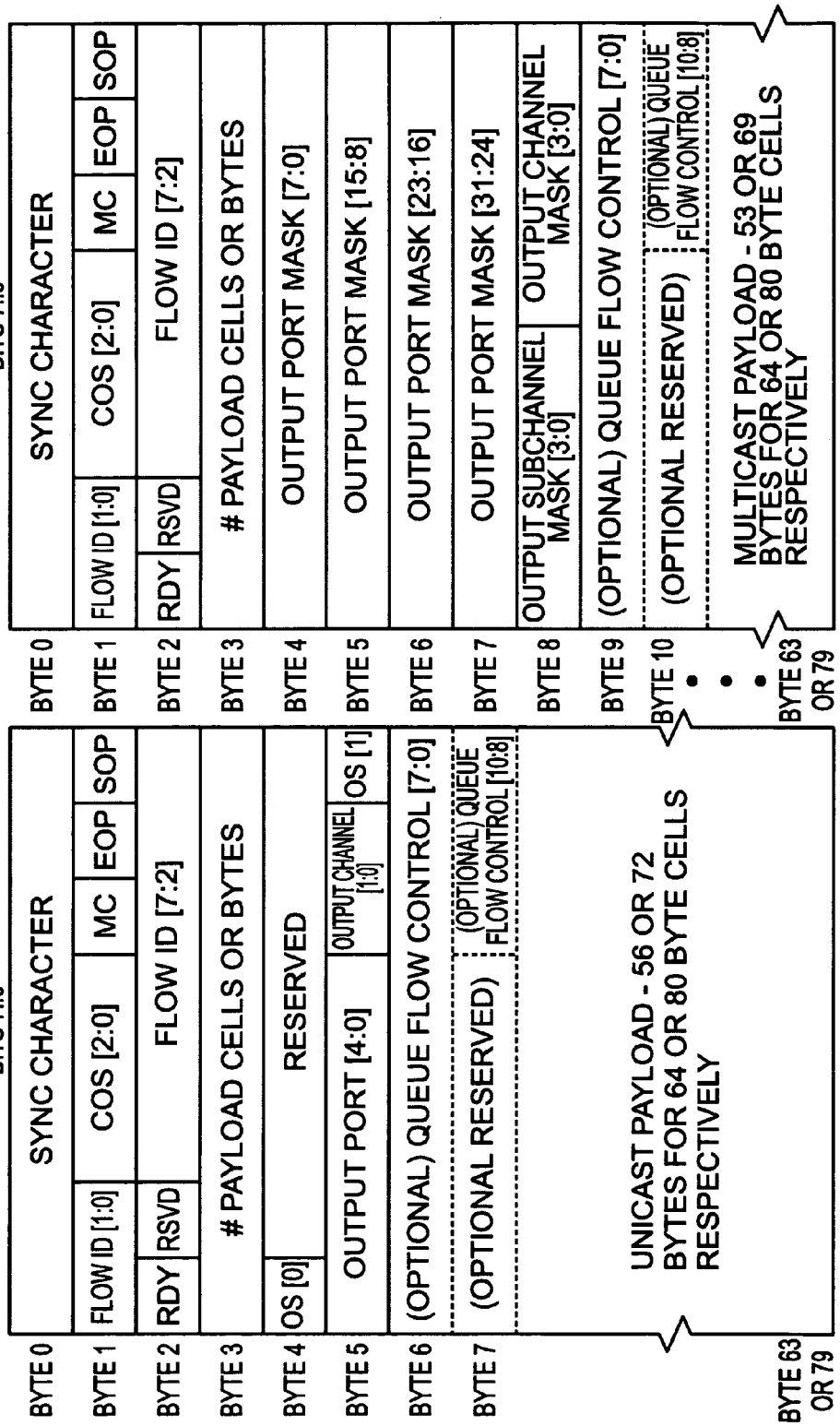
FIG. 12 depicts an exemplary configuration of the Cyclone Input Cell Format, with Subchannels.

FIG. 12 depicts an exemplary configuration of the Cyclone Input Cell Format, with Subchannels. Within an OC-192 channel the user may choose to designate four OC-48 subchannels as logically separate destinations. A subchannel field (and mask for multicast) are added to the cell format to support this. The increased switching granularity of subchannels restricts the FID field to eight bits, therefore the two MSBs of the 10-bit field in the cell header are dropped from the cell format. The RDY bit is moved into the freed space. Note that if an oPQ is used as the egress scheduler instead of the EDFQ, the FID field might not be needed, again removing cell header overhead and adding to payload.

FIG. 13 is a table illustrating an exemplary configuration of the Incoming Unicast Cell Header Contents with Subchannels.

FIG. 14 is a table illustrating an exemplary configuration of the Incoming Multicast Cell Header Contents with Subchannels.

Cyclone Output Cell Format

Figure 15:
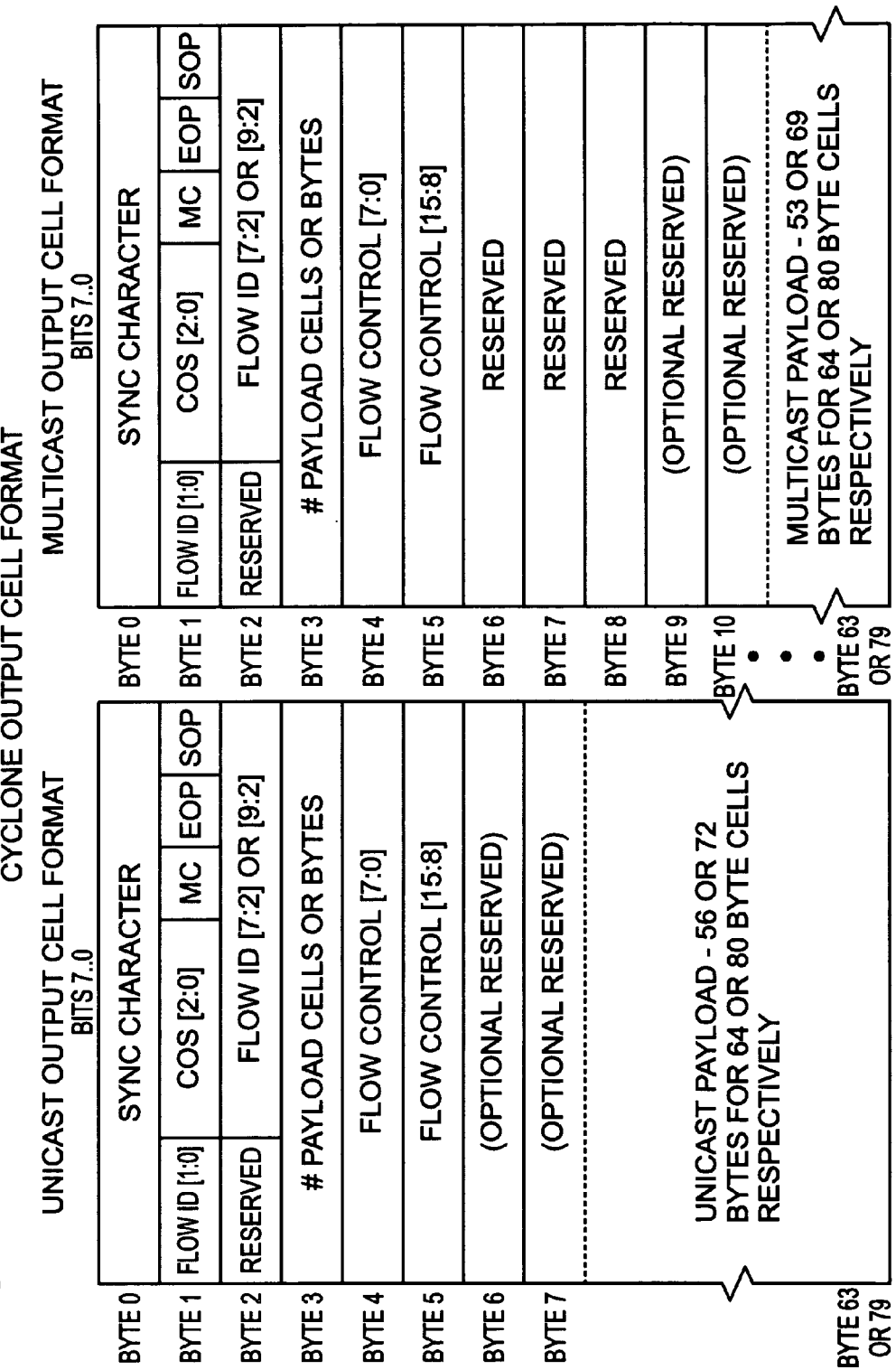
FIG. 15 illustrates an exemplary configuration of the Cyclone Output Cell Format.

FIG. 15 illustrates an exemplary configuration of the Cyclone Output Cell Format. Outgoing cells contain all the information necessary to identify packets and the flow of traffic to which they belong. SOP, EOP, MC, COS, FID, and LEN are all transported through the switch fabric. A flow control message is inserted in bytes 4 and 5. The output cell format is typically tailored to the needs of the eTM, which in turn depend on the types of traffic being switched.

FIG. 16 is a table illustrating an exemplary configuration of the Outgoing Cell Header Contents, without Subchannels.

FIG. 17 is a table illustrating an exemplary configuration of the Outgoing Cell Header Contents, with Subchannels. Note when subchannels are in use, the Flow ID parameter is reduced to eight bits.

Cyclone Flow Control Field

FIG. 18 depicts an exemplary configuration of the Cyclone Flow Control Field Format FC[15:0]. Credit information transmitted by the Cyclone switch fabric is embedded in the outgoing cell headers. Each cell carries a single credit. The figure and associated tables show where the 16-bit flow control field reside.

Cyclone Packet Structure

Packets Consist of groups of cells. A Cyclone packet can have a length of 1 cell up to 192 cells. Packets, as with cells, must arrive on one and only one serial link. The switch fabric always manages traffic at the packet level and not the cell level. All cells in a packet will be transferred out of the switch fabric continuously on one and only one serial link.

The MC, LEN[7:0], and FID[9/7:0] fields are only inspected at the start of a packet and are applied to the whole packet.

The following remarks summarize how cell fields are used:

Idle cells are ignored by the fabric. An idle cell is defined as start of packet (SOP) and end of packet (EOP) fields set to '1', and the length field set to '0'. Flow control fields are valid in idle cells.

The RDY bit is inspected every cell.

The combination of Output Port, Output Channel, and Output Subchannel (optional) completely describe the physical destination for unicast packets.

The combination of Output Port Mask, Output Channel Mask, and Output Subchannel Mask (optional) completely describe the physical destination(s) for multicast packets.

The COS bits are used by the PQ for ingress priority queueing.

The COS bits and Flow ID bits are presented to the EDFQ and used for scheduling.

Multiple packets belonging to the same flow that are being transmitted to the switch fabric using multiple links should have their transmission times staggered such that they arrive at the fabric in the correct order. Ordering will be maintained through the fabric.

Each serial link is capable of receiving an OC-24 channel with cellularization and 8B/10B encoding (a net line rate of 1,244.16 Mbps×10/9×10/8=1728 Mbps, for 80-byte cells without subchannels). Each serial link stays well within the 2.5 Gbps bandwidth limit, with cell overhead considered.

There are exception conditions for treating incoming cells that do not meet the classification requirements:

If a link is idle and a cell that is not the start of a new packet is received, it will be ignored.

If a link is currently receiving cells for a packet and a "new packet" cell arrives before an end of packet has arrived, the new cell will be marked as the end of the previous packet. The content of this new cell will be ignored along with any further cells belonging to the "new packet". The next packet, however, will be treated as normal.

Flows, which contain multiple packets, are guaranteed to maintain order as long as the following is met:

Packets arrive and exit on links of the same subchannel (or channel if there are not subchannels).

Packets contain the same COS and Flow ID.

Link Synchronization

Figure 19:
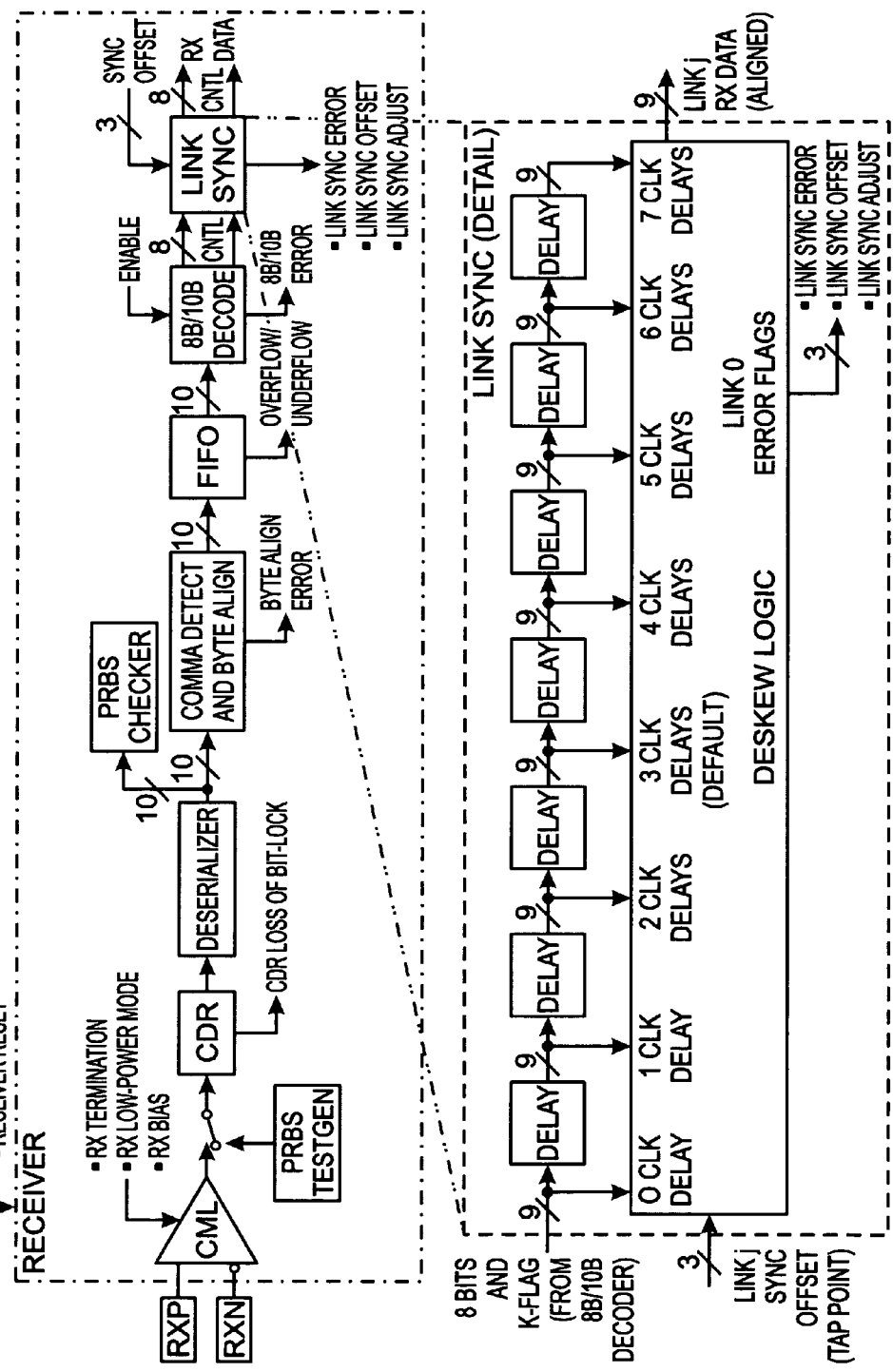
FIG. 19 is a Link Synchronization (Deskew Logic) Block Diagram.

FIG. 19 is a Link Synchronization (Deskew Logic) Block Diagram. Following the 8B/10B decoder on serial receiver links is the link synchronization mechanism. The link synchronizer is responsible for finding the beginning of cells based on the synchronization character. After finding the beginnings of all the incoming cells from the different serial links, it deskews them so that they are all aligned with each other. This function is only used with ViX-v3 cell formats. In OC-48, 2 links are paired together to pass cell information that must be deskewed. In OC-192, 8 links are paired together to pass cell information that must be deskewed. The link deskew mechanism can calibrate out up to 6 clock cycles of skew. The nominal point can be set such that it can calibrate out between 0 to 6 or −3 to +3 cycles based on the "Sync_Delay" bits as shown in Figure. If a variation in skew is detected during steady-state operation for any of the links, the synchronizer will recalibrate that link. Since there is a FIFO buffer before the deskew, only a FIFO overflow or underflow situation would trigger a recalibration of the deskew mechanism once in steady-state operation. The link synchronization status is reported to the microprocessor interface. After the link deskew mechanism, data is passed to the Memory Subsystem core.

Backplane Cell Structure

Figure 20:
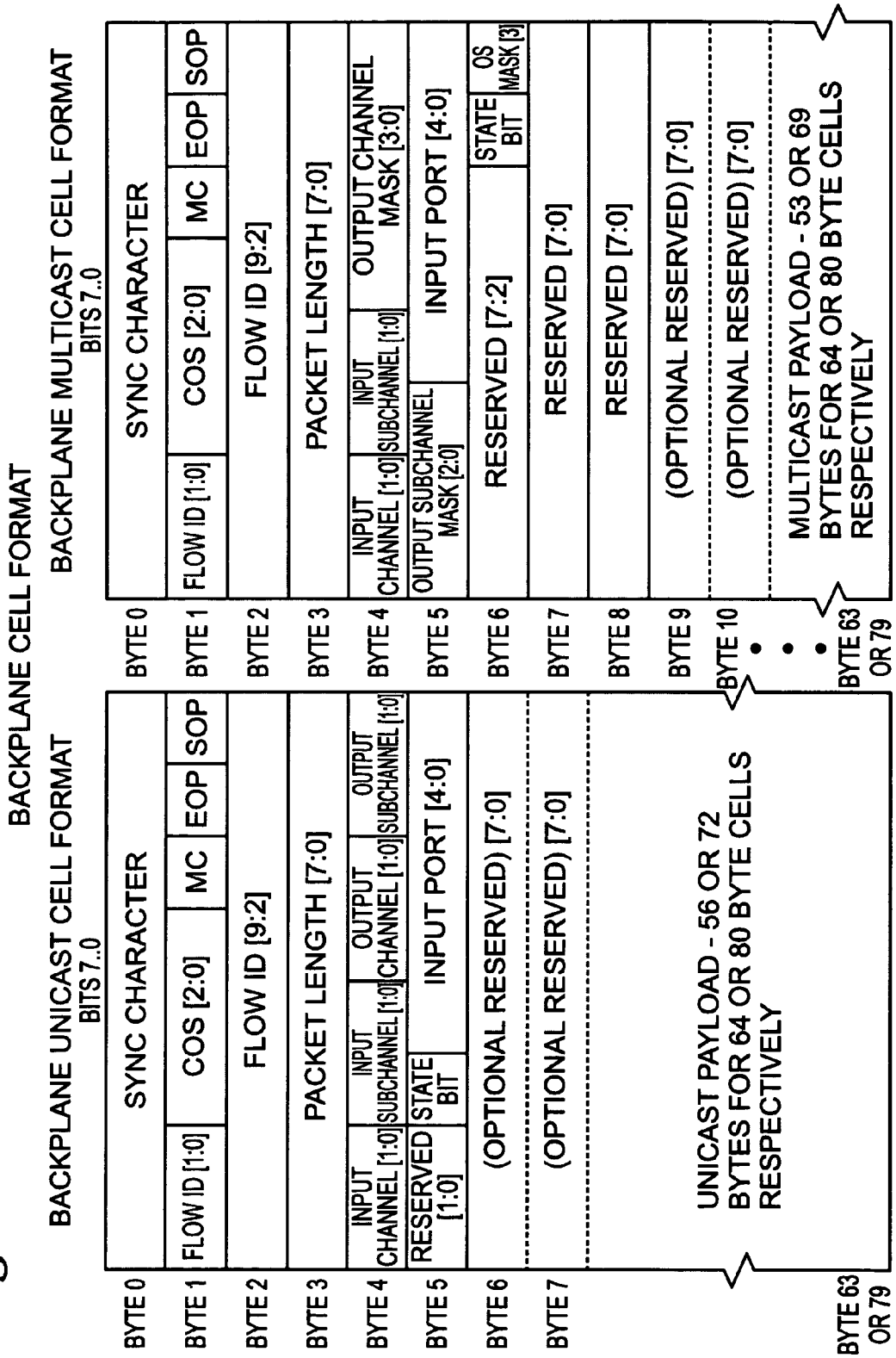
FIG. 20 depicts an exemplary configuration of the backplane cell format.

FIG. 20 depicts an exemplary configuration of the backplane cell format. Cell traffic across the backplane identifies input and output designations for channel and subchannel. It also replaces the output port designation with the input port. The addition of a State bit is used for the purpose of resynchronizing backplane flow control credits. The RDY bit is removed since it serves no purpose across the backplane. All other fields including the payload are passed without modifications.

FIG. 21 is a table illustrating an exemplary configuration of the Backplane Unicast Cell Header Contents.

FIG. 22 is a table illustrating an exemplary configuration of the Backplane Multicast Cell Header Contents. The backplane cells are again fully programmable. All cell formats can be programmed to one configuration for unicast and a different configuration for multicast cells. Finally, it should be realized that cells can be 64 byte or 80 byte cells.

Figure 23:
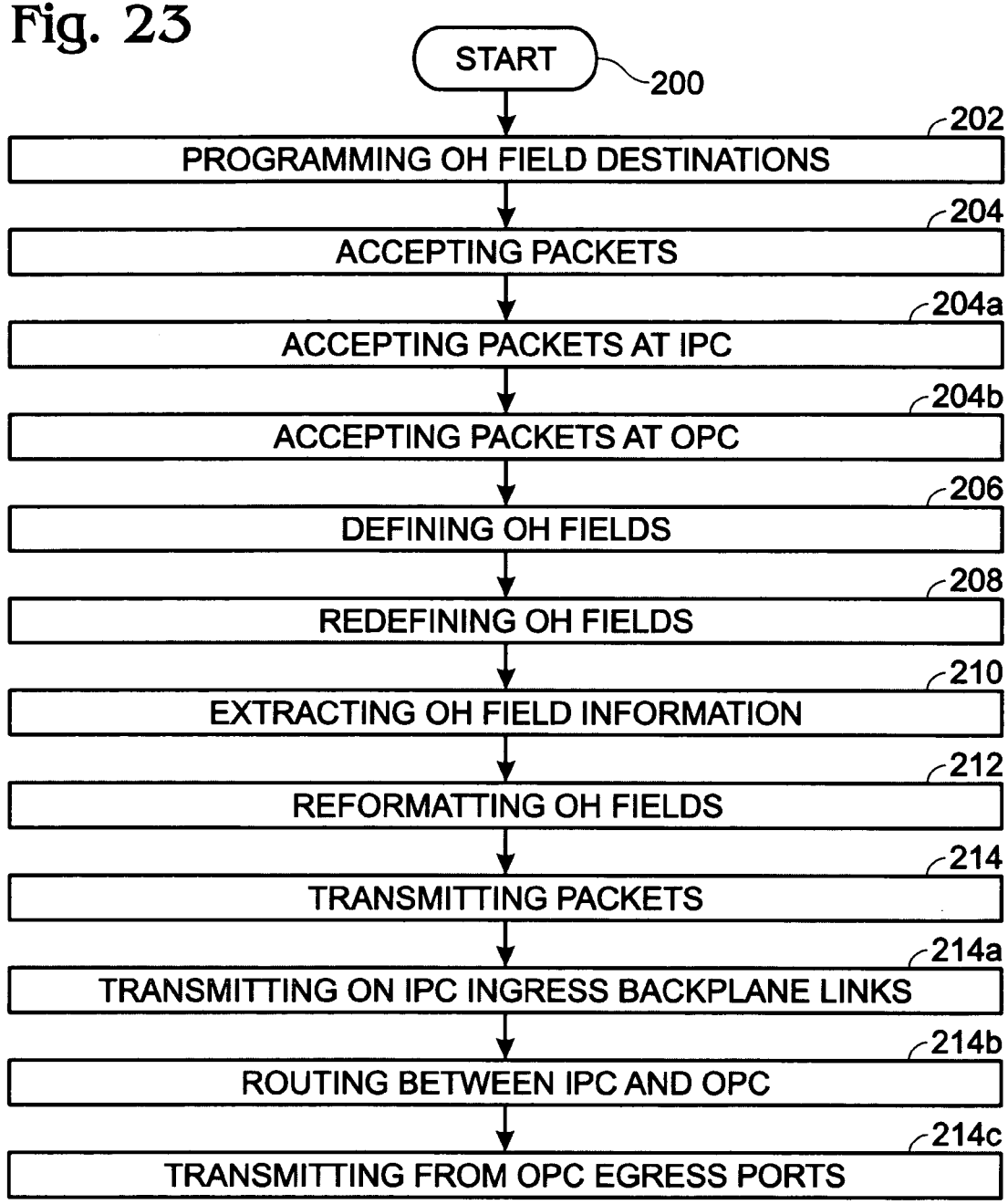
FIG. 23 is a flowchart illustrating the present invention method for controlling packet header information in a packet communications switch fabric.
Figure 24:
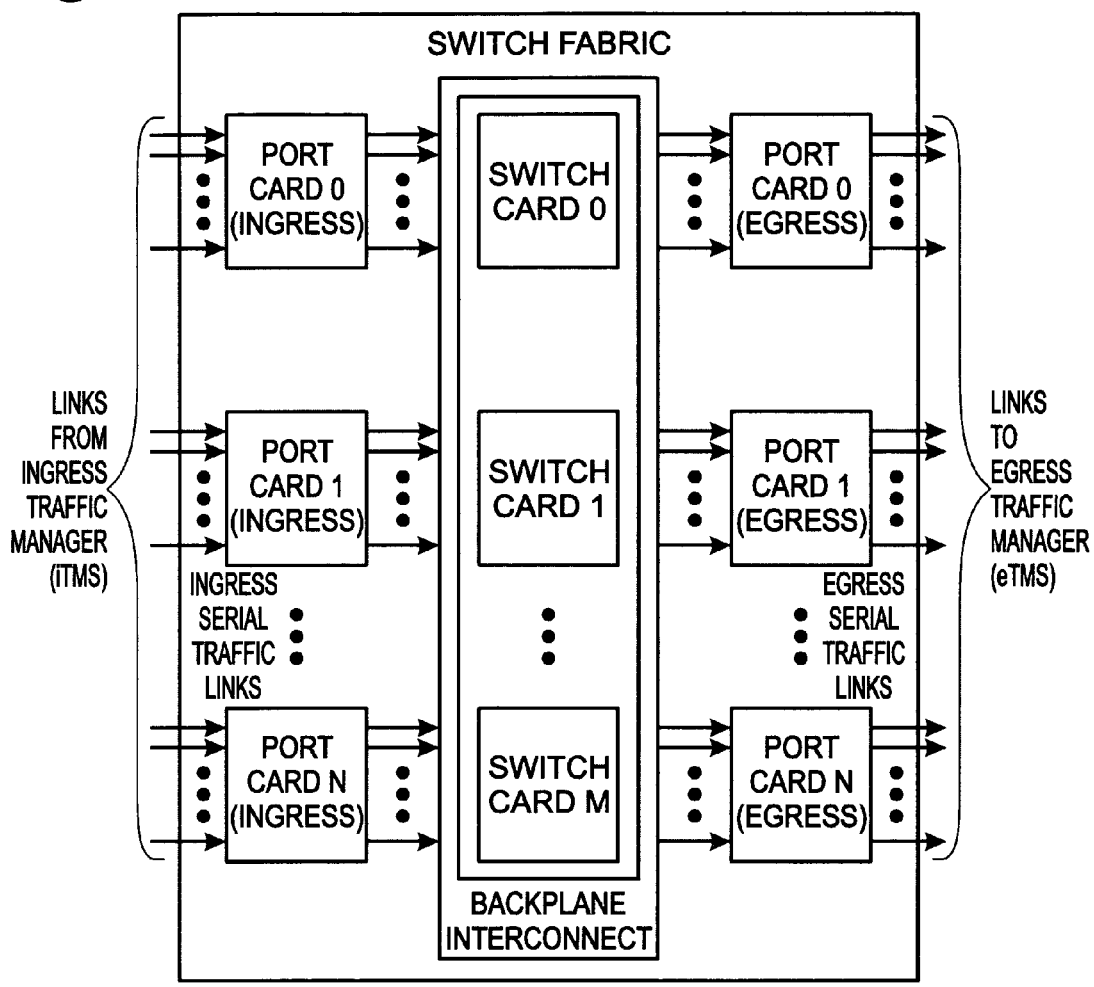
FIG. 24 is a schematic block diagram of a general switch fabric system (prior art).

FIG. 23 is a flowchart illustrating the present invention method for controlling packet header information in a packet communications switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 200.

Step 202 programs cell header overhead (OH) field definitions. Step 204 accepts a packet including a plurality of cells and corresponding cell headers, each cell header including a plurality of overhead fields. Step 206 defines the cell header OH fields (in the accepted packets). For example, Step 206 may define cell header OH field location, position, meaning, structure, and/or length. In some aspects, Step 208 redefines the cell header overhead fields by: modifying OH field information; relocating OH fields in the cell header; and/or adding OH fields to the cell header. In other aspects, Step 210 extracts OH field information. In some aspects, Step 212 reformats the OH fields. In other aspects, Steps 210 and 212 may be considered special cases of Step 208. Step 214 transmits the packet.

In some aspects of the method, accepting a packet including a plurality of cells and corresponding cell headers in Step 204 includes substeps. Step 204a accepts the packets at input port card (IPC) ingress ports. Step 204b accepts the packets at output port card (OPC) egress backplane data links. Then, transmitting the packet in Step 214 includes substeps. Step 214a transmits the packet at IPC ingress backplane data links. Step 214b routes packets between the input port card and the output port card on backplane data links, through an intervening crossbar. Step 214c transmits the packet from OPC egress ports.

In some aspects, accepting packets at an input port card ingress port in Step 204a includes buffering the packets in an ingress memory subsystem (iMS). Then, redefining the cell header OH fields in Step 208 includes redefining the cell header OH fields buffered in the iMS.

In other aspects, routing information packets between the input port card on backplane data links through an intervening crossbar in Step 214b includes substeps (not shown). In Step 214b1 the iMS transmits buffered packets on a selected backplane data link. Step 214b2 buffers the packets in an output port card egress memory subsystem (eMS). Then, redefining the cell header OH fields in Step 208 includes redefining the cell header OH fields buffered in the eMS.

Typically, routing information packets between the input port card on backplane data links through an intervening crossbar in Step 214b includes an IPC ingress priority queue (iPQ) managing the backplane data links. Then, there may be additional substeps (not shown). In Step 214d an OPC egress PQ (oPQ) manages output port card egress ports. In Step 214e an OPC iPQ relays backplane control information from the eMS to the IPC iPQ.

In some aspects, redefining the cell header OH fields buffered in the iMS (Step 208) includes: the iMS extracting information from a first OH field from the cell header, and sending the information to the iPQ; the iMS exchanging the information in second OH field from the cell header with information from a third OH field; the iMS moving the position of a fourth OH field in the cell header; the iMS reformatting the OH field structure; the iMS adding a fifth OH field to the cell header and populating the fifth OH field with information; the iMS replacing information in a sixth OH field with alternate information; and/or the iMS defining a seventh field embedded in an eighth field.

Likewise, redefining the cell header OH fields buffered in the eMS (Step 208) includes: the eMS extracting information from the first OH field from the cell header, and sending the information to the OPC iPQ; the eMS extracting information from the first OH field from the cell header, and sending the information to the OPC oPQ; the eMS exchanging the information in second OH field from the cell header with information from a third OH field; the eMS moving the position of a fourth OH field in the cell header; the eMS formatting the OH field structure; the eMS adding a fifth OH field to the cell header and populating the fifth OH field with information; the eMS replacing information in a sixth OH field with alternate information; and/or the eMS extracting information from a seventh field embedded in an eighth field.

In some aspects, the iMS defining a seventh field embedded in an eighth field (Step 208) includes the iMS embedding a seventh field of secondary class of service (COS) information. The eMS extracting information from a seventh field embedded in an eighth field includes the eMS extracting the secondary COS information. Then, transmitting the packet in Step 214 includes transmitting the packet in response to the secondary COS information.

In other aspects, the iMS defining a seventh field embedded in an eighth field (Step 208) includes the iMS embedding dummy port information, selected from a plurality of unused OPC egress ports, in the OH fields, and the eMS extracting the dummy port information. Then, the OPC iPQ relaying backplane control information from the eMS to the IPC iPQ (Step 214e) includes the eMS sending the dummy port information. Routing information packets between the input port card on backplane data links through an intervening crossbar in Step 214b includes the IPC iPQ using the dummy port information in the management of the backplane data links.

A system and method of programmably controlling the definition of cell header OH fields, for use in a switch fabric, has been provided. A few examples have been presented to illustrate the invention. However, the invention is not limited to merely these examples. Other variations and embodiments of the invention will occur to those skilled in the art.

We claim:

1. In a packet communications switch fabric, a method for controlling packet header information, the method comprising:

accepting a packet including a plurality of cells and corresponding cell headers, each cell header including a plurality of overhead fields;
defining the cell header overhead (OH) fields;
redefining the cell header overhead fields as follows:
modifying OH field information;
relocating OH fields in the cell header;
adding OH fields to the cell header;
extracting OH field information;
reformatting the OH fields;
transmitting the packet;
wherein accepting a packet including a plurality of cells and corresponding cell headers includes:
   accepting the packets at input port card (IPC) ingress ports; and,
   accepting the packets at output port card (OPC) egress backplane data links;
wherein transmitting the packet includes:
   transmitting the packet at IPC ingress backplane data links;
   routing packets between the input port card and the output port card on backplane data links, through an intervening crossbar; and,
   transmitting the packet from OPC egress ports;
wherein accepting packets at an input port card ingress port includes buffering the packets in an ingress memory subsystem (iMS);
wherein redefining the cell header OH fields includes redefining the cell header OH fields buffered in the iMS;
wherein routing information packets between the input port card on backplane data links through an intervening crossbar includes;
   the iMS transmitting buffered packets on a selected backplane data link; and,
   buffering the packets in an output port card egress memory subsystem (eMS);
wherein redefining the cell header OH fields includes redefining the cell header OH fields buffered in the eMS;
wherein routing information packets between the input port card on backplane data links through an intervening crossbar includes an IPC ingress priority queue (iPQ) managing the backplane data links; and,
wherein transmitting the packet includes:
   an OPC egress PQ (oPQ) managing output port card egress ports; and,
   an OPC iPQ relaying backplane control information from the eMS to the IPC iPQ;
wherein redefining the cell header OH fields buffered in the iMS includes;
   the iMS extracting information from a first OH field from the cell header, and sending the information to the iPQ;
   the iMS exchanging the information in second OH field from the cell header with information from a third OH field;
   the iMS moving the position of a fourth OH field in the cell header;
   the iMS reformatting the OH field structure;
   the iMS adding a fifth OH field to the cell header and populating the fifth OH field with information;
   the iMS replacing information in a sixth OH field with alternate information; and,
   the iMS defining a seventh field embedded in an eighth field;
wherein redefining the cell header OH fields buffered in the eMS includes:
   the eMS extracting information from the first OH field from the cell header, and sending the information to the OPC iPQ;
   the eMS extracting information from the first OH field from the cell header, and sending the information to the OPC oPQ;
   the eMS extracting the information in second OH field from the cell header with information from a third OH field;
   the eMS moving the position of a fourth OH field in the cell header;
   the eMS reformatting the OH field structure;
   the eMS adding a fifth OH field to the cell header and populating the fifth OH field with information;
   the eMS replacing information in a sixth OH field with alternate information; and,
   the eMS extracting information from a seventh field embedded in an eighth field;
wherein the iMS defining a seventh field embedded in an eighth field includes the iMS embedding dummy port information, selected from a plurality of unused OPC egress ports, in the OH fields; and,
wherein the eMS extracting information from a seventh field embedded in an eighth field includes the eMS extracting the dummy port information;
wherein an OPC iPQ relaying backplate control information from the eMS to the IPC iPQ includes the eMS sending the dummy port information; and,
wherein routing packets between the input port card and the output port card on backplate data links, through an intervening crossbar includes the IPC iPQ using the dummy port information in the management of the backplane data links.

2. The method of claim 1 wherein the iMS defining a seventh field embedded in an eighth field includes the iMS embedding a seventh field of secondary class of service (COS) information; and,
   wherein the eMS extracting information from a seventh field embedded in an eighth field includes the eMS extracting the secondary COS information; and,
   wherein transmitting the packet includes transmitting the packet in response to the secondary COS information.

3. The method of claim 1 further comprising:
programming the cell header OH field definitions.

4. The method of claim 1 wherein defining the cell header overhead (OH) fields includes defining a cell header OH field location, position, meaning, structure, and length.

5. In a packet communications switch fabric, a system for controlling packet header information, the system comprising:
   a port card having an input interface to accept a packet including a plurality of cells and corresponding cell headers, each cell header including a plurality of overhead fields, the port card defining the cell header overhead (OH) fields and transmitting the packet from an output interface, the port card including:
     an input port card (IPC) that redefines the cell header OH fields, having ingress ports to accept packets and ingress backplane data links to transmit packets; and,
     an output port card (OPC) that redefines the cell header OH fields, having egress backplate data links to accept packets and egress ports to transmit packets;
   a switch card crossbar having crossbar inputs selectively connectable to crossbar outputs for transferring packets between the IPC the OPC with the crossbar inputs connected to the IPC ingress backplane data links, and the crossbar outputs connected to the OPC egress backplane data links;

wherein the port card extracts OH field information from the cell header and reformats the OH fields in the cell header, and the port card redefining the cell header overhead fields by:
- modifying OH field information;
- relocating OH fields in the cell header; and,
- adding OH fields to the cell header;

wherein the IPC includes an ingress memory subsystem (iMS) having inputs connected to the ingress ports for buffering the accepted packets and outputs transmitting buffered packets on the egress backplane data links, the IPC redefining the cell header OH fields buffered in the iMS;

wherein the OPC includes an egress MS (eMS) having inputs connected to the egress backplane data links for buffing accepted packets and outputs for transmitting the buffered packets on the OPC egress ports, the OPC redefining the cell header OH fields buffered in the eMS;

wherein the IPC includes an ingress priority queue (iPQ) connected to the iMS and the crossbar for managing the backplane data links;

wherein the OPC includes;
- an egress PQ (oPQ) connected to the eMS for managing the OPC egress ports; and,
- an iPQ connected to the eMS for relaying backplane control information to the IPC iPQ;

wherein the IPC iMS redefines cell header OH fields as follows:
- extracting and accepting information from a first OH field from the cell header;
- exchanging the information in second OH field from the cell header with information from a third OH field;
- moving the position of a fourth OH field in the cell header;
- reformatting the OH field structure;
- adding a fifth OH field to the cell header and populating the fifth OH field with information;
- replacing information in a sixth OH field with alternate information; and,
- defining a seventh field embedded in an eighth field;

wherein the OPC eMS redefines the cell header OH fields as follows:
- extracting information from the first OH field from the cell header, and sending the information to the OPC iPQ;
- extracting information from the first OH field from the cell header, and sending the information to the OPC oPQ;
- exchanging he information in second OH field from the cell header with information from a third OH field;
- moving the position of a fourth OH field in the cell header;
- reformatting the OH field structure;
- adding a fifth OH field to the cell header and populating the fifth OH field with information;
- replacing information in a sixth OH field with alternate information; and,
- extracting information from a seventh field embedded in an eighth field;

wherein the IPC iMS embeds dummy port information, selected from a plurality of unused OPC egress ports, in cell header OH fields; and, wherein the OPC eMS extracts the dummy port information; and, wherein an OPC iPQ sends the dummy port information to the IPC iPQ; and, wherein the IPC iPQ uses the dummy port information in the management of the backplane data links.

6. The system of claim 5 wherein the IPC iMS embeds a seventh field of secondary class of service (COS) information; and,
  wherein the OPC emS extracts the secondary COS information and transmits the packet in response to the secondary COS information.

7. The system of claim 5 wherein the port card defines cell header OH field location, position, meaning, structure, and length.

8. The system of claim 5 wherein the port card has an input to accept programming instructions for defining cell header OH fields.

* * * * *